(12) United States Patent
Jun et al.

(10) Patent No.: US 12,062,493 B2
(45) Date of Patent: *Aug. 13, 2024

(54) MULTILAYER ELECTRONIC COMPONENT

(71) Applicant: SAMSUNG ELECTRO-MECHANICS CO., LTD., Suwon-si (KR)

(72) Inventors: Ho In Jun, Suwon-si (KR); Kyeong Jun Kim, Suwon-si (KR); Jin Sung Chun, Suwon-si (KR); Woo Chul Shin, Suwon-si (KR); Seul Gi Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,707

(22) Filed: Jun. 20, 2023

(65) Prior Publication Data

US 2023/0335337 A1    Oct. 19, 2023

Related U.S. Application Data

(63) Continuation of application No. 17/675,283, filed on Feb. 18, 2022, now Pat. No. 11,721,480, which is a
(Continued)

(30) Foreign Application Priority Data

Aug. 23, 2019    (KR) .................. 10-2019-0103792

(51) Int. Cl.
*H01G 4/008* (2006.01)
*H01G 4/012* (2006.01)
(Continued)

(52) U.S. Cl.
CPC ............ *H01G 4/008* (2013.01); *H01G 4/012* (2013.01); *H01G 4/232* (2013.01); *H01G 4/30* (2013.01)

(58) Field of Classification Search
CPC ........ H01G 4/005; H01G 4/008; H01G 4/012; H01G 4/12; H01G 4/232; H01G 4/30; H01G 4/306
See application file for complete search history.

(56) References Cited

U.S. PATENT DOCUMENTS 9,349,539 B2     5/2016   Kobayashi et al.
10,121,595 B2    11/2018  Hamamori et al.
(Continued)

FOREIGN PATENT DOCUMENTS

CN    101051565 A    10/2007
CN    103854854 A    6/2014
(Continued)

OTHER PUBLICATIONS

Chinese Office Action dated Sep. 28, 2021 issued in Chinese Patent Application No. 202010274058.0 {with English translation).
(Continued)

*Primary Examiner* — Nathan Milakovich
(74) *Attorney, Agent, or Firm* — Morgan, Lewis & Bockius LLP

(57) ABSTRACT

A multilayer electronic component includes a body including a dielectric layer and an internal electrode, and an external electrode including an electrode layer disposed on the body and connected to the internal electrode, a first plating layer disposed on the electrode layer, and a conductive resin layer disposed on the first plating layer. The first plating layer has surface roughness higher at an interface with the conductive resin layer than at an interface with the
(Continued)

electrode layer, and the conductive resin layer includes a conductive metal and a base resin.

10 Claims, 5 Drawing Sheets

Related U.S. Application Data continuation of application No. 16/776,610, filed on Jan. 30, 2020, now Pat. No. 11,289,270.

(51) Int. Cl.
*H01G 4/232* (2006.01)
*H01G 4/30* (2006.01)

(56) References Cited

U.S. PATENT DOCUMENTS

| | | | |
|---|---|---|---|
| 10,269,494 | B2 | 4/2019 | Otani |
| 10,748,715 | B2 | 8/2020 | Kawaguchi et al. |
| 10,832,869 | B2 | 11/2020 | Kim et al. |
| 11,081,281 | B2 | 8/2021 | Lee et al. |
| 11,721,480 | B2 * | 8/2023 | Jun ..................... H01G 4/232 361/305 |
| 2007/0242416 | A1 | 10/2007 | Saito et al. |
| 2012/0314336 | A1 | 12/2012 | Ogawa et al. |
| 2014/0043724 | A1 | 2/2014 | Kang et al. |
| 2014/0160627 | A1 | 6/2014 | Kobayashi et al. |
| 2014/0182907 | A1 | 7/2014 | Lee et al. |
| 2014/0233147 | A1 | 8/2014 | Hong et al. |
| 2015/0053472 | A1 | 2/2015 | Lee et al. |
| 2015/0075853 | A1 | 3/2015 | Lee et al. |
| 2015/0109718 | A1 | 4/2015 | Choi |
| 2017/0032896 | A1 | 2/2017 | Otani |
| 2017/0365419 | A1 | 12/2017 | Demizu et al. |
| 2018/0286583 | A1 | 10/2018 | Onoue et al. |
| 2018/0337001 | A1 | 11/2018 | Tozawa et al. |
| 2019/0244749 | A1 | 8/2019 | Adachi et al. |
| 2021/0027945 | A1 | 1/2021 | Takahashi et al. |
| 2021/0082623 | A1 | 3/2021 | Kim et al. |

FOREIGN PATENT DOCUMENTS

| | | | |
|---|---|---|---|
| CN | 104576050 | A | 4/2015 |
| CN | 107527740 | A | 12/2017 |
| CN | 108695071 | A | 10/2018 |
| JP | 2002-329634 | A | 11/2002 |
| JP | 2007-281400 | A | 10/2007 |
| JP | 2009-170835 | A | 7/2009 |
| JP | 2017-034010 | A | 2/2017 |
| JP | 2017-118087 | A | 6/2017 |
| KR | 10-2014-0021416 | A | 2/2014 |
| KR | 10-1548804 | B1 | 8/2015 |
| KR | 10-2017-0076336 | A | 7/2017 |
| WO | 2019/244541 | A1 | 12/2019 |

OTHER PUBLICATIONS

Office Action dated Apr. 3, 2024 issued in the related Chinese Patent Application No. 202210424104.X.

Office Action dated Apr. 7, 2024 issued in the related Chinese Patent Application No. 202210159747.6.

Office Action issued on Mar. 8, 2024, in the corresponding Korean Patent Application No. 10-2019-0103792 with English translation.

* cited by examiner

MULTILAYER ELECTRONIC COMPONENT

CROSS-REFERENCE TO RELATED APPLICATION

This application is the continuation application of U.S. patent application Ser. No. 17/675,283 filed on Feb. 18, 2022, now U.S. Pat. No. 11,721,480 issued on Aug. 8, 2023, which is the continuation application of U.S. patent application Ser. No. 16/776,610 filed Jan. 30, 2020, now U.S. Pat. No. 11,289,270 issued on Mar. 29, 2022, which claims the benefit of Korean Patent Application No. 10-2019-0103792 filed on Aug. 23, 2019, with the Korean Intellectual Property Office, the disclosures of which are incorporated herein by reference.

BACKGROUND

1. Field

The present disclosure relates to a multilayer electronic component.

2. Description of Related Art

A multilayer ceramic capacitor (MLCC), a type of multilayer electronic component, is a chip type condenser, mounted on the printed circuit boards of various types of electronic products, including image display devices such as liquid crystal displays (LCD) and plasma display panels (PDP), computers, smartphones, mobile phones, and the like, serving to charge or discharge electricity.

Such a multilayer ceramic capacitor may be used as a component of various electronic devices due to advantages thereof, such as miniaturization, high capacity, and ease of mounting. As electronic devices such as computers and mobile devices are miniaturized and implemented with high output, demand for miniaturization and implementation of high capacity multilayer ceramic capacitors is increasing.

In addition, in recent years, as industry interest in electronic products has increased, multilayer ceramic capacitors have been required to have high reliability and high strength characteristics to be used in automobiles and infotainment systems.

In order to secure high reliability and high strength characteristics, a method of changing an external electrode composed of a conventional electrode layer into a two-layer structure of an electrode layer and a conductive resin layer has been proposed.

The two-layer structure of the electrode layer and the conductive resin layer may apply a resin composition containing a conductive material to the electrode layer to absorb external shocks and prevent penetration of a plating solution to improve reliability.

However, there is a problem that internal stress increases because coefficients of thermal expansion (CTE) of the electrode layer and the conductive resin layer may be different. As the internal stress increases, delamination, cracks, etc., which adversely affect reliability, may occur.

Therefore, a need exists for further improving high reliability and high strength characteristics.

SUMMARY

An aspect of the present disclosure is to improve coupling force between an electrode layer and a conductive resin layer.

An aspect of the present disclosure is to improve electrical connectivity between an electrode layer and a conductive resin layer.

An aspect of the present disclosure is to suppress the occurrence of delamination, cracks, and the like.

However, various and advantageous advantages and effects of the present disclosure are not limited to the above description, and will be more readily understood in the course of describing specific embodiments of the present disclosure.

According to an embodiment, a multilayer electronic component includes a body including a dielectric layer and an internal electrode, and an external electrode including an electrode layer disposed on the body and connected to the internal electrode, a first plating layer disposed on the electrode layer, and a conductive resin layer disposed on the first plating layer. The first plating layer has surface roughness higher at an interface with the conductive resin layer than at an interface with the electrode layer, and the conductive resin layer includes a conductive metal and a base resin.

According to another embodiment, a multilayer electronic component includes a body including alternately stacked first internal electrodes and second internal electrodes with dielectric layers therebetween, and first and second external electrodes respectively connected to the first and second internal electrodes and each including an electrode layer disposed on the body and connected to the respective first or second internal electrodes, a first plating layer disposed on the electrode layer, and a conductive resin layer disposed on the first plating layer. Each first plating layer has center line average roughness of 150 to 500 nm at an interface with the conductive resin layer.

According to a further embodiment, a multilayer electronic component includes a body including a dielectric layer and an internal electrode, and an external electrode including an electrode layer disposed on the body and connected to the internal electrode, a first plating layer disposed on the electrode layer, and a conductive resin layer disposed on the first plating layer. The first plating layer has surface roughness higher at an interface with the conductive resin layer than a surface roughness at an interface between the body and the electrode layer.

BRIEF DESCRIPTION OF DRAWINGS

The above and other aspects, features, and other advantages of the present disclosure will be more clearly understood from the following detailed description taken in conjunction with the accompanying drawings, in which.

DETAILED DESCRIPTION

Figure 1:
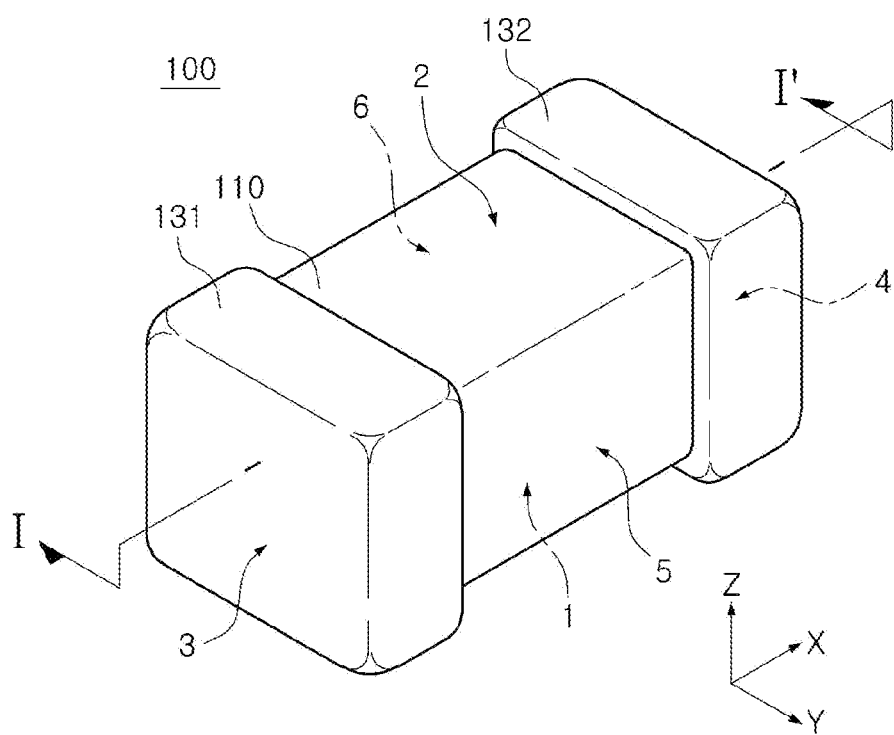
FIG. 1 is a schematic perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral reference same elements in the drawings.

In the drawings and description, irrelevant elements may be omitted to clearly characterize the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a second direction, an L direction, or a length direction, a Y direction may be defined as a third direction, a W direction, or a width direction, and a Z direction may be defined as a first direction, a T direction, or a thickness direction.

Multilayer Electronic Component

FIG. 1 is a schematic perspective view of a multilayer electronic component according to an embodiment of the present disclosure.

Figure 2:
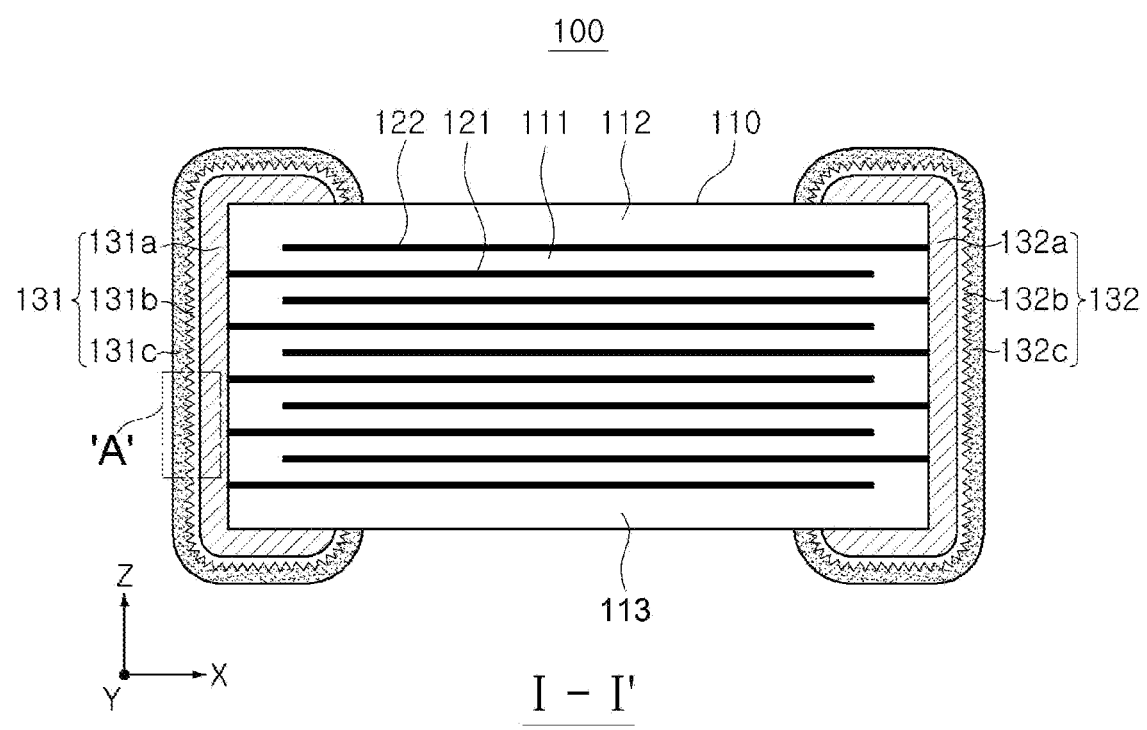
FIG. 2 is a schematic cross-sectional view taken along line I-I' of FIG. 1.

FIG. 2 is a schematic cross-sectional view taken along line I-I' of FIG. 1.

Figure 3:
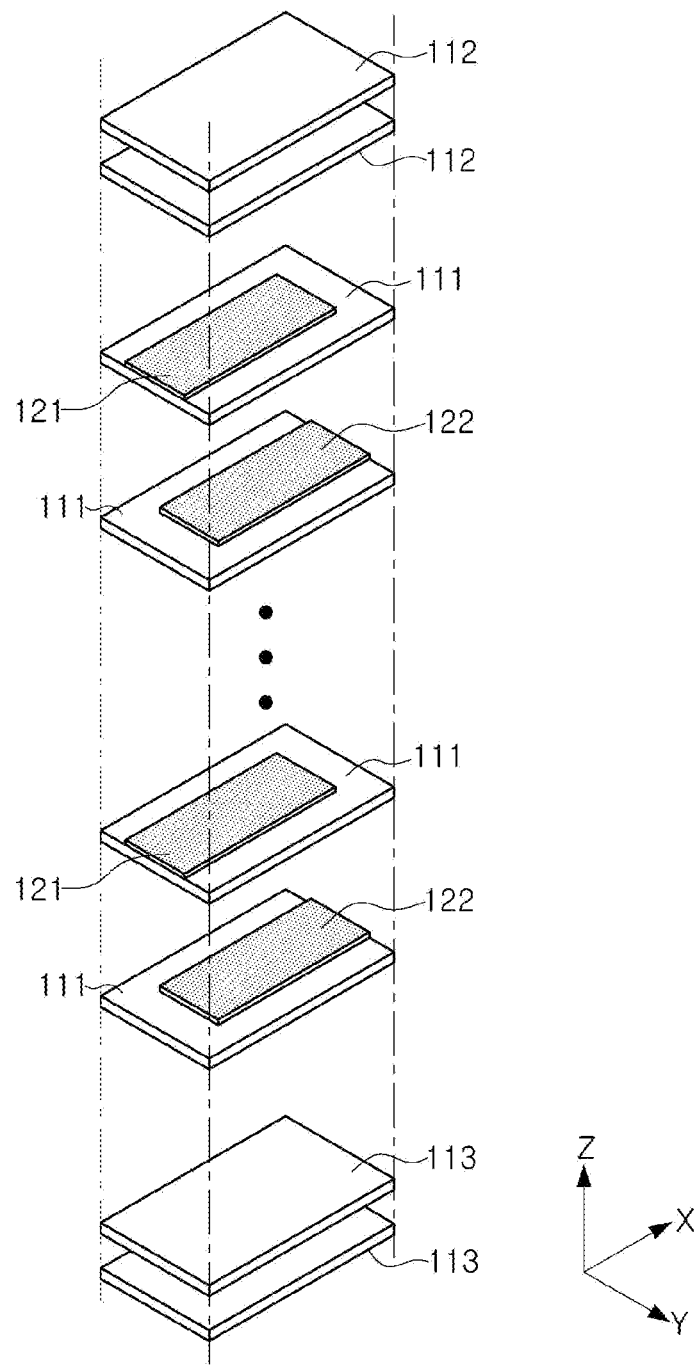
FIG. 3 is an exploded perspective view schematically illustrating a body in which a dielectric layer and an internal electrode are stacked according to an embodiment of the present disclosure.

FIG. 3 is an exploded perspective view schematically illustrating a body in which a dielectric layer and an internal electrode are stacked according to an embodiment of the present disclosure.

Figure 4:
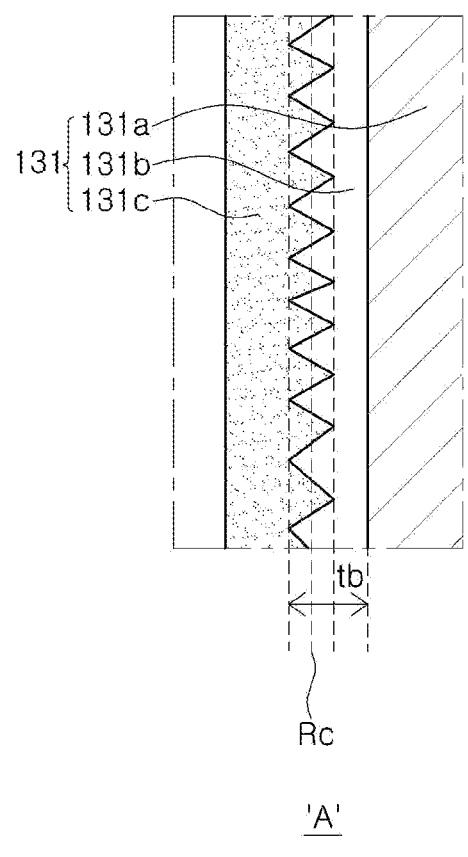
FIG. 4 is an enlarged view of region A of FIG. 2 according to an embodiment of the present disclosure.

FIG. 4 is an enlarged view of region A of FIG. 2 according to an embodiment of the present disclosure.

Hereinafter, a multilayer electronic component according to an embodiment of the present disclosure will be described in detail referring to FIGS. 1 to 4.

According to an embodiment of the present disclosure, a multilayer electronic component 100 includes a body 110 including dielectric layers 111 and internal electrodes 121 and 122; and external electrodes 131 and 132 including electrode layers 131a and 132a disposed on the body and respectively connected to the internal electrodes 121 and 122, first plating layers 131b and 132b respectively disposed on the electrode layers 131a and 132a, and conductive resin layers 131c and 132c respectively disposed on the first plating layers 131b and 132b. The first plating layers 131b and 132b have surface roughness at an interface with the conductive resin layers 131c and 132c, and the conductive resin layers 131c and 132c include a conductive metal and a base resin.

The body 110 has internal electrodes 121 and 122 that are alternately stacked with dielectric layers 111 therebetween.

The specific shape of the body 110 is not particularly limited, but as illustrated, the body 110 may have a hexahedral shape, or a shape similar thereto. Due to shrinkage of ceramic powder particles included in the body 110 during a sintering process, the body 110 may have a substantially hexahedral shape, but may not have a hexahedral shape having completely straight lines.

The body 110 may have first and second surfaces 1 and 2 opposing each other in a thickness direction (Z direction), third and fourth surfaces 3 and 4 connected to the first and second surfaces 1 and 2 and opposing each other in a length direction (X direction), and fifth and sixth surfaces 5 and 6 connected to the first and second surfaces 1 and 2 and connected to the third and fourth surfaces 3 and 4 and opposing each other in a width direction (Y direction).

The plurality of dielectric layers 111 forming the body 110 are in a sintered state, and a boundary between adjacent dielectric layers 111 may be integrated, such that it may be difficult to confirm without using a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$) material, a lead composite perovskite material, a strontium titanate ($SrTiO_3$) material, or the like.

As a material for forming the dielectric layer 111, various ceramic additives, organic solvents, plasticizers, binders, dispersants, and the like, may be added to powder particles such as barium titanate ($BaTiO_3$) according to the purpose of the present disclosure.

The body 110 may include a capacitance formation portion disposed in the body 110 and including first internal electrode(s) 121 and second internal electrode(s) 122 disposed to oppose each other with the dielectric layer(s) 111 interposed therebetween and having capacitance formed therein, and cover portions 112 and 113 formed in upper and lower portions of the capacitance formation portion.

The capacitance formation portion is a portion serving to contribute to capacitance formation of the capacitor, and may be formed by repeatedly and alternately laminating a plurality of first and second internal electrodes 121 and 122 with dielectric layers 111 interposed therebetween.

The upper cover portion 112 and the lower cover portion 113 may be formed by laminating a single dielectric layer or two or more dielectric layers on the upper surface or below the lower surface of the capacitance formation portion in an up-and-down direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111. In this regard, the upper cover portion 112 may be provided above an uppermost internal electrode, and the lower cover portion 113 may be provided below a lowermost internal electrode, from among the alternately stacked first and second internal electrodes 121 and 122.

The plurality of internal electrodes 121 and 122 are disposed to oppose each other with the dielectric layer(s) 111 interposed therebetween.

The internal electrodes 121 and 122 may include first and second internal electrodes 121 and 122 alternately disposed to oppose each other with a dielectric layer interposed between each pair of adjacent internal electrodes.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4. A first external electrode 131 may be disposed on the third surface 3 of the body to be connected to the first internal electrode(s) 121, and a second external electrode 132 may be disposed on the fourth surface 4 of the body to be connected to the second internal electrode(s) 122.

The first and second internal electrodes 121 and 122 may be electrically separated and isolated from each other by the dielectric layer 111 disposed in the middle.

Referring to FIG. 3, the body 110 may be formed by alternately stacking a dielectric layer 111 on which the first internal electrode 121 is printed and a dielectric layer 111 on which the second internal electrode 122 is printed in a thickness direction (Z direction), and then firing.

A formation material of the first and second internal electrodes 121 and 122 is not particularly limited, and may be formed using a precious metal material such as palladium (Pd) and palladium-silver (Pd—Ag) alloys, and a conductive paste containing one or more materials of nickel (Ni) and copper (Cu).

As a printing method of the conductive paste, a screen printing method, a gravure printing method, or the like, may be used, but the present disclosure is not limited thereto.

External electrodes 131 and 132 are disposed on the body 110 and are connected to the internal electrodes 121 and 122, respectively. As illustrated in FIG. 2, the external electrodes 131 and 132 may include first and second external electrodes 131 and 132 respectively connected to the first and second internal electrodes 121 and 122.

The first and second external electrodes 131 and 132 may be electrically connected to the first and second internal electrodes 121 and 122, respectively, to form capacitance, and the second external electrode 132 may be connected to a potential different from that of the first external electrode 131.

The external electrodes 131 and 132 may include respective electrode layers 131a and 132a connected to the internal electrodes 121 and 122, respective first plating layers 131b and 132b disposed on the electrode layers 121 and 122, and respective conductive resin layers 131c and 132c disposed on the first plating layers 131b and 132b.

The first plating layers 131b and 132b have surface roughness at the interface with the conductive resin layers 131c and 132c. In some examples, the first plating layers 131b and 132b have higher surface roughness at the interface with the conductive resin layers 131c and 132c than at an interface with the electrode layers 131a and 132a. In other examples, the first plating layers 131b and 132b have higher surface roughness at the interface with the conductive resin layers 131c and 132c than at an interface between the body and the electrode layers 131a and 132a. Accordingly, physical coupling force may be improved by an anchor effect, a lifting phenomenon between the electrode layers 131a and 132a and the conductive resin layers 131c and 132c may be suppressed, and delamination and cracks, which adversely affect reliability by suppressing an increase in an internal stress, may be suppressed.

In addition, the first plating layers 131b and 132b may serve to not only improve a physical bonding force, but also to improve electrical connectivity between the electrode layers 131a and 132a and the conductive resin layers 131c and 132c.

A center line average roughness Ra of the first plating layers 131b and 132b at the interface with the conductive resin layers 131c and 132c may be 150 nm to 500 nm. That is, the surface roughness of the first plating layers 131b and 132b may have a center line average roughness Ra of 150 nm to 500 nm.

Surface roughness refers to a degree of fine unevenness generated on the surface when the surface is processed, and is also referred to as surface roughness.

The surface roughness is caused by a tool used for processing, suitability of a processing method, scratches on the surface, rust, etching, or the like. In expressing the degree of roughness, the surface is cut on a plane perpendicular thereto and has a height viewed on a cross-section thereof. An average value of the heights from an imaginary center line is referred to as center line average roughness, and may be expressed as Ra.

In the present disclosure, the center line average roughness of the first plating layers 131b and 132b at the interface with the conductive resin layers 131c and 132c may be defined as Ra.

Specifically, the center line average roughness Ra of the first plating layers 131b and 132b may be calculated by drawing a virtual center line Rc with respect to peaks and valleys in the surface roughness of the first plating layers 131b and 132b at the interface with the conductive resin layers 131c and 132c.

Next, after measuring each distance (for example, $r_1$, $r_2$, $r_3$, ... $r_n$) of each point on the surface based on the virtual center line Rc of the surface roughness, the center line average roughness Ra of the first plating layers 131b and 132b at the interface with the conductive resin layers 131c and 132c may be calculated with a value obtained by calculating the average value of each distance as shown in Equation 1 below.

$$Ra = \frac{|r_1| + |r_1| + |r_2| + |r_3| + \ldots + |r_n|}{n} \quad \text{[Equation 1]}$$

When the centerline average roughness Ra of the first plating layers 131b and 132b at the interface with the conductive resin layers 131c and 132c is less than 150 nm, it may be difficult to secure a sufficient physical coupling force with the conductive resin layers 131c and 132c. Note that the centerline average roughness of the first plating layers 131b and 132b at the interface with the electrode layers 131a and 132a may be less than 150 nm. Moreover, the centerline average roughness of the electrode layers 131a and 132a at an interface with the body 110 may be less than 150 nm.

On the other hand, when the center line average roughness Ra of the first plating layers 131b and 132b at the interface with the conductive resin layers 131c and 132c exceeds 500 nm, the thickness of the first plating layers 131b and 132b may be increased excessively, and cracks may occur in the first plating layers 131b and 132b.

A thickness (tb) of the first plating layers 131b and 132b (e.g., a maximum thickness of the first plating layers 131b and 132b) may be 300 nm to 2000 nm.

When the thickness (tb) of the first plating layers 131b and 132b is less than 300 nm, it may be difficult to secure sufficient surface roughness.

On the other hand, when the thickness (tb) of the first plating layers 131b and 132b exceeds 2000 nm, the external electrodes 131 and 132 may be too thick, which may lower the capacity per unit volume of the multilayer component 100.

A material for forming the first plating layers 131b and 132b is not particularly limited as long as it is a material that can electrically connect the electrode layers 131a and 132a and the conductive resin layers 131c and 132c.

For example, the first plating layers 131b and 132b may include one or more selected from a group consisting of Cu, Sn, Ni, and alloys thereof.

In addition, a method of imparting surface roughness to the first plating layers 131b and 132b is not particularly limited.

For example, in order to impart surface roughness to the first plating layers 131b and 132b, a physical processing method may be used, or a chemical processing method such as anisotropic etching may be used.

In addition, an oxide may be formed to impart the surface roughness to the first plating layers 131b and 132b, or a plating process condition may be changed and plating may be roughly performed to impart the surface roughness.

In an embodiment, the first plating layers 131b and 132b may include $Cu_2O$ in a region having the surface roughness.

When a black oxide is used as a method of forming an oxide to impart the surface roughness, the first plating layers 131b and 132b may include $Cu_2O$ in a region having the surface roughness. The surface roughness may be formed in a form in which ends of unevenness portions are blunt, and the lengths of the unevenness portions are short.

In an embodiment, the first plating layers 131b and 132b may include CuO in a region having the surface roughness.

When a brown oxide is used as a method of forming an oxide to impart the surface roughness, the first plating layers 131b and 132b may include CuO in a region having the surface roughness. The surface roughness may be formed in a form in which ends of unevenness portions are sharp, and sizes of the unevenness portions are large.

Figure 5:
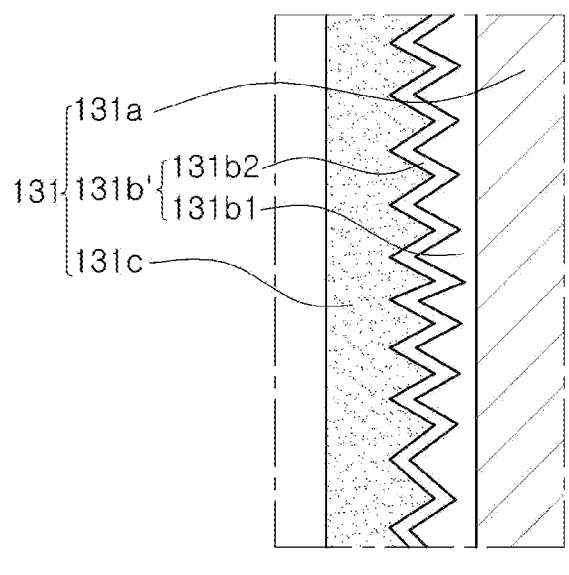
FIG. 5 is an enlarged view of region A of FIG. 2 according to another embodiment of the present disclosure.

FIG. 5 is an enlarged view of region A of FIG. 2 according to another embodiment of the present disclosure.

Referring to FIG. 5, an intermetallic compound layer 131b2 containing Sn may be disposed at an interface between the first plating layer 131b' and the conductive resin layer 131c.

When the first plating layer 131b' is formed of Sn, since Sn has a low melting point, a metal component included in the conductive resin layer 131c and Sn may be bonded at an interface with the conductive resin layer 131c to form an intermetallic compound layer 131b2. Accordingly, the electrical connectivity between the first plating layer 131b' and the conductive resin layer 131c may be further improved.

Therefore, according to another embodiment of the present disclosure, the first plating layer 131b' may include a layer 131b1 including Sn disposed on the electrode layer and an intermetallic compound layer 131b2 disposed on the layer 131b1 including Sn.

Electrode layers 131a and 132a may include a conductive metal and glass.

The conductive metal used for the electrode layers 131a and 132a is not particularly limited as long as it is a material that can be electrically connected to the internal electrode to form capacitance. For example, it may be one or more selected from a group consisting of copper (Cu), silver (Ag), and nickel (Ni), and alloys thereof.

The electrode layers 131a and 132a may be formed by applying a conductive paste prepared by adding glass frit to the conductive metal powder particles and then firing the conductive paste.

Meanwhile, according to an embodiment of the present disclosure, the electrode layers 131a and 132a may include Cu and glass, and the first plating layers 131b and 132b may be Cu plating layers.

The conductive metal included in the electrode layers 131a and 132a and the metal included in the first plating layers 131b and 132b may be made of Cu to improve a bonding force and electrical connectivity. In the case of a Cu plating layer, since it can impart the surface roughness by the above-described various methods, an effect of improving a physical coupling force and improving electrical connectivity according to the present disclosure may be further increased.

The conductive resin layers 131c and 132c include a conductive metal and a base resin.

The conductive metal included in the conductive resin layers 131c and 132c serves to be electrically connected to the first plating layers 131b and 132b.

The conductive metal included in the conductive resin layers 131c and 132c is not particularly limited as long as it is a material that can be electrically connected to the first plating layers 131b and 132b, and may include, for example, one or more selected from a group consisting of copper (Cu), silver (Ag), and nickel (Ni), and alloys thereof.

The conductive metal included in the conductive resin layers 131c and 132c may include one or more of spherical powder particles and flake powder particles. That is, the conductive metal may consist only of flake powder particles, or may consist only of spherical powder particles, or may be in a form of a mixture of flake powder particles and spherical powder particles.

Here, the spherical powder particles may include a form that is not completely spherical, for example, may include a form in which a length ratio (long axis/short axis) of the long axis and the short axis may be greater than one and less than 1.95.

The flake powder particles refers to powder particles having a flat and elongated form, and is not particularly limited, but, for example, a length ratio (long axis/short axis) of the long axis and the short axis may be 1.95 or more.

The lengths of the long axis and the short axis of the spherical powder particles and the flake powder particles may be measured from an image obtained by scanning X and Z direction cross-sections (L-T cross-sections) cut at the central portion of the width Y direction of the multilayer electronic component.

A base resin included in the conductive resin layers 131c and 132c performs a role of securing an adhesive property and absorbing shocks.

The base resin included in the conductive resin layers 131c and 132c is not particularly limited as long as it has adhesive properties and shock absorbing properties and can be mixed with the conductive metal powder particles to form a paste. For example, the base resin may include an epoxy-based resin.

In addition, the conductive resin layers 131c and 132c may include a conductive metal, an intermetallic compound, and a base resin.

The external electrodes 131 and 132 may include first and second external electrodes 131 and 132 disposed on the third and fourth surfaces 3 and 4, respectively.

The first external electrode 131 may include a connection portion disposed on the third surface 3 of the body and a band portion extending from the connection portion to a portion of the first and second surfaces. Similarly, the second external electrode 132 may include a connection portion disposed on the fourth surface 4 of the body and a band portion extending from the connection portion to a portion of the first and second surfaces.

In this case, the band portion may extend not only to a portion of the first and second surfaces 1 and 2, but also to a portion of the fifth and sixth surfaces 5 and 6 in the connection portion.

Meanwhile, the external electrodes 131 and 132 may further include a second plating layer disposed on the conductive resin layers 131c and 132c to improve mounting characteristics.

For example, the second plating layer may be a Ni plating layer or a Sn plating layer, may be a form in which the Ni plating layer and the Sn plating layer are sequentially formed on the conductive resin layers 131c and 132c, and may also include a plurality of Ni plating layers and/or a plurality of Sn plating layers.

As set forth above, according to the present disclosure, structures are provided to improve coupling force between an electrode layer of an external electrode and a conductive resin layer by disposing a plating layer having surface roughness between the electrode layer of the external electrode and the conductive resin layer.

However, the various advantages and effects of the present disclosure are not limited to the above description, and will be more readily understood in the process of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A multilayer electronic component comprising:
   a body including a dielectric layer and an internal electrode; and
   an external electrode including an electrode layer disposed on the body and connected to the internal electrode through a surface of the body, a first plating layer disposed on the electrode layer, and a conductive resin layer disposed on the first plating layer,
   wherein the electrode layer includes Cu and glass and the conductive resin layer includes a conductive metal and a base resin, the conductive metal comprising Cu, and wherein the first plating layer comprises an oxide containing Cu at an interface with the conductive resin layer.

2. The multilayer electronic component of claim 1, wherein the first plating layer has a center line average roughness of 150 to 500 nm at the interface with the conductive resin layer.

3. The multilayer electronic component of claim 1, wherein the first plating layer has a thickness of 300 to 2000 nm.

4. The multilayer electronic component of claim 1, wherein the first plating layer has surface roughness at the interface with the conductive resin layer.

5. The multilayer electronic component of claim 1, wherein the oxide containing Cu comprises CuO or $Cu_2O$.

6. The multilayer electronic component of claim 1, wherein the first plating layer has an intermetallic compound layer including Sn at the interface with the conductive resin layer.

7. The multilayer electronic component of claim 1, wherein the conductive resin layer includes an outermost layer of the external electrode disposed on the surface of the body.

8. The multilayer electronic component of claim 1, wherein the conductive metal included in the conductive resin layer includes one or more of spherical powder particles and flake powder particles.

9. The multilayer electronic component of claim 8, wherein the spherical powder particles include a form in which a length ratio (long axis/short axis) of the long axis and the short axis is greater than one and less than 1.95.

10. The multilayer electronic component of claim 8, wherein the flake powder particles include a form in which a length ratio (long axis/short axis) of the long axis and the short axis is greater than one and less than 1.95.

* * * * *